United States Patent [19]

Gregory et al.

[11] 4,217,271
[45] Aug. 12, 1980

[54] BASIC AZO DYESTUFFS CONTAINING A N-PICOLINIUM ALKYLENE AMINO PHENYL GROUP

[75] Inventors: Peter Gregory; Edwin D. Harvey, both of Manchester, England

[73] Assignee: Imperial Chemical Industries Limited, London, England

[21] Appl. No.: 891,384

[22] Filed: Mar. 29, 1978

[30] Foreign Application Priority Data

May 3, 1977 [GB] United Kingdom ............... 18434/77

[51] Int. Cl.² ............................................. C09B 29/36
[52] U.S. Cl. .................... 260/156; 260/155; 260/154; 260/146 R; 260/146 D
[58] Field of Search ........... 260/156, 155, 154, 146 R, 260/146 D

[56] References Cited

U.S. PATENT DOCUMENTS

| 3,538,074 | 11/1970 | Hegar | 260/156 |
| 3,640,993 | 2/1972 | Hegar et al. | 260/146 R |

FOREIGN PATENT DOCUMENTS

| 2548879 | 5/1976 | Fed. Rep. of Germany | 260/154 |
| 2605621 | 8/1976 | Fed. Rep. of Germany | 260/156 |
| 1211079 | 11/1970 | United Kingdom | 260/156 |
| 1389266 | 4/1975 | United Kingdom | 260/156 |
| 1399272 | 7/1975 | United Kingdom | 260/156 |

Primary Examiner—Arthur P. Demers
Attorney, Agent, or Firm—Cushman, Darby & Cushman

[57] ABSTRACT

Basic azo dyestuffs devoid of sulphonic acid and carboxylic acid groups and of the formula

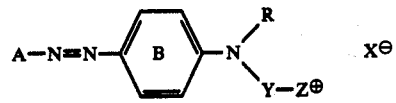

wherein A is an optionally substituted aromatic carboxylic or heterocyclic radical, R is an optionally substituted lower alkyl, aralkyl or cycloalkyl radical, Y is an optionally substituted alkylene radical of 1 to 4 carbon atoms, $Z^\oplus$ is a 3- or 4-methylpyridinium group, X is an anion and the ring B may be further substituted, useful for dyeing synthetic polymeric materials especially polymers and copolymers of acrylonitrile.

5 Claims, No Drawings

BASIC AZO DYESTUFFS CONTAINING A N-PICOLINIUM ALKYLENE AMINO PHENYL GROUP

This invention relates to basic azo dyestuffs containing pendant cationic groups, to the manufacture of such dyestuffs and to their use for the colouration of synthetic polymeric materials in the form of fibres, films, threads, tapes and textile materials generally and particularly for the colouration of polymers and copolymers of acrylonitrile and also acid modified polyesters and polyamides and polymers and copolymers of dicyanoethylene.

According to the present invention there are provided basic azo dyestuffs devoid of sulphonic acid and carboxylic acid groups and of the formula:

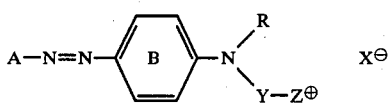

wherein A is an optionally substituted aromatic carbocyclic or heterocyclic radical, R is an optionally substituted lower alkyl, cycloalkyl or aralkyl radical, Y is an optionally substituted alkylene radical of 1 to 4 carbon atoms, $Z^{\oplus}$ is a 3- or 4-methylpyridinium group, X is an anion and the ring B may be further substituted.

A, which is the residue of the diazo component, may be any aromatic carbocyclic or heterocyclic residue. A may for example be a radical of the benzene or naphthalene series and may carry as substituents any of the substituents normally found in dyestuff molecules, for example alkyl, cycloalkyl, aralkyl, alkoxy, aralkoxy, aryl, carbalkoxy, acyloxy, arylazo, acylamino, aryloxy, arylamino, carbamoyl, sulphamyl, alkylmercapto, arylmercapto, dialkylammino and substituted derivatives thereof and nitro, cyano, halogeno or trifluoromethyl groups.

Examples of heterocyclic rings which may be represented by A include thiazole, isothiazole, benzthiazole, benzisothiazole, thiadiazole, triazole, quinoline, thiophene, pyrrole, indole, carbazole, pyridine, isoquinoline and quinoxalone rings, any of which may be substituted by the types of substituents listed hereinbefore.

The ring B may be further substituted with any of the substituents normally present in dyestuff molecules, for example those types listed hereinbefore.

R may be any optionally substituted lower alkyl, cycloalkyl or aralkyl radical. By the term lower alkyl we means alkyl containing from 1 to 4 carbon atoms. Examples of R include methyl, ethyl, propyl, butyl, benzyl, cyclohexyl, isopropyl, cyclopentyl and isobutyl.

Y may be any optionally substituted alkylene radical of 1 to 4 carbon atoms, examples of Y include $$-CH_2-CH_2-, -CH-CH_2-, -CH_2CH_2CH_2-,$$
$$\phantom{-CH_2-CH_2-, -}CH_3$$

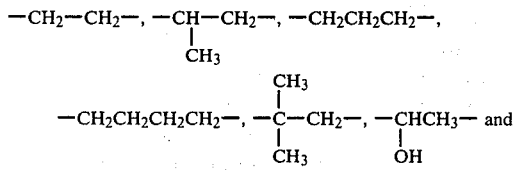

—continued $$-CH_2CHCH_2-.$$
$$\phantom{-CH_2}OH$$

Y is preferably the —CH$_2$CH$_2$—radical.

The group $Z^{\oplus}$ is a 3- or 4-methylpyridinium group attached to the remainder of the molecule via the nitrogen atom and is preferably 4-methylpyridinium.

As anions represented by $X^{\ominus}$ there may be mentioned for example inorganic anions such as chloride, bromide, iodide, nitrate, tetrachlorozincate, bisulphate or sulphate or organic anions such as acetate, propionate, methosulphate, methyl sulphonate, the water-soluble dyestuffs will contain a corresponding molar proportion of the cationic part of the dyestuff.

Replacement of one anion by another anion in the dyestuff may be carried out by known methods, for example metathesis.

A preferred class of dyestuffs of the present invention are dyestuffs of the formula:

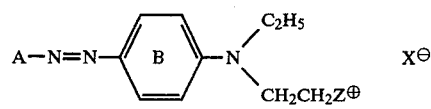

wherein A and X are as hereinbefore defined, $A^{\oplus}$ is 4-methylpyridinium and wherein the ring B does not carry any further substituent or is substituted with a methyl group ortho to the azo group, $X^{\ominus}$ is preferably chloride.

A is preferably the residue of the diazo component derived from 4-nitro-2-chloroaniline, 4-nitro-2-cyanoaniline, 5-nitro-2-amino-thiazole, 3-phenyl-5-amino-1,2,4-thiadiazole or 2,4-dinitro-6-bromoaniline.

As a further feature of the present invention there is provided a process for the manufacture of the dyestuffs of the invention which comprises diazotising an amine of the formula A–NH$_2$ and coupling the resultant diazonium salt in acid medium with a compound of the formula:

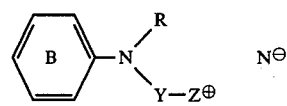

wherein A, B, R, Y, Z and X are as hereinbefore defined.

Diazotisation and coupling may be carried out by methods known in the art.

Examples of amines which may be used as diazo components include o-, m- or p-nitroaniline, 2,4-dinitroaniline, 2,4-dinitro-6-(chloro or bromo)-aniline, 4-methanesulphonylaniline, 4- or 5-nitro-2-toluidine, 4- or 5-nitro-2-anisidine, 2,4,6-trinitro- aniline, 2,4-dinitro-6-carbomethoxyaniline, 2-amino-5-nitrobenzotrifluoride, 2,4-bis(methanesulphonyl)aniline, 2-(chloro- or bromo-)-4-nitroaniline, 4- or 5-nitromethylanthranilate, 2,6-di(-chloro- or bromo-)aniline-4-sulphonamide, 2,6-di(-chloro- or bromo-)-4-methylsulphonylaniline, 2,5-di-(chloro- or bromo-)-4,6-dinitroaniline, 2-amino-3,5-dinitrobenzotrifluoride, 3-amino-2-(chloro- or bromo-)-4,6-dinitro(toluene or anisole), 3-amino-4-(chloro- or bromo-)-2,6-dinitro(toluene or anisole), 2- or 4-cyanoaniline, 4-nitro-2-cyanoaniline, 2,4-dinitro-6- cyanoaniline, 2-nitro-4-cyanoaniline, 2-chloro-4-cyanoaniline, 3-amino-2,4,6-trinitrotoluene, 2-(chloro- or bromo-)-4-methylsulphonylaniline, 2-(chloro- or bromo-)-4-sulphamylaniline, 2-amino-5-nitrophenylmethylsulphone, 2-amino-3,5-dinitrophenylmethylsulphone, 2-amino-3-(chloro- or bromo-)-5-nitrophenylmethysulphone, 2-sulphamyl-4-nitroaniline, 2-methylsulphamyl-4-nitroaniline, 2-ethylsulphamyl-4-nitroaniline, 2-butylsulphamyl-4-nitroaniline, 2-dimethylsulphamyl-4-nitroaniline, 2-methylsulphamyl-4,6-dinitroaniline, 2-methylsulphamyl-4-nitro-6-(chloro- or bromo-)aniline, 2-phenylsulphamyl-4-nitroaniline, methyl-2-amino-3-(chloro- or bromo-)-5-nitrobenzoate, dimethyl-2-amino-5-nitroterephthalate, 4-aminobenzenesulphonamide, 2-nitro-4-methylaniline, 2-cyano-4-methylaniline, 4-aminobenzene-(2,5- or 3,5-dichloro)-benzenesulphon-N,N-dimethylamide, 4-amino-3-chlorobenzenesulphon-N,N-dimethylamide, 5-chloro-2,4-bis-(N,N-dimethylaminosulphonyl)aniline, 2-chloro-5-cyanoaniline, 2-cyano-5-chloroaniline, 2,4-dicyanoaniline, 4-aminodiphenylsulphone, 2-aminobenzenesulphon-N,N-dimethylamide, 2- or 4-aminobenzonitrile, 2-aminophenylmethyl or ethylsulphone, 3-amino-1,2,4-triazole, 2-amino-6-methoxybenzthiazole. .

2-amino-6-nitrobenzthiazole
5-amino-3-phenyl-1,2,4-thiadiazole
2-amino-3,5-dicyano-4-methylthiophene
2-amino-3-carbethoxy-5-nitrothiophene
2-amino-3-cyano-5-nitrothiophene
2-amino-3-nitro-5-cyanothiophene
2-amino-3,5-dinitrothiophene
2-amino-5-nitrothiazole
2-amino-5-bromothiazole
2-amino-5-chlorothiazole
3-amino-5-nitro-2,1-benzisothiazole
3-amino-5-nitro-7-bromo-2,1-benzisothiazole Examples of coupling components which may be used include
N-2-(N-ethyl-N-phenylamino)-ethyl-4-methylpyridinium chloride
N-2-(N-ethyl-N-3-methylphenylamino)-ethyl-4-methylpyridinium chloride
N-2-(N-methyl-N-3-methylphenylamino)-ethyl-4-methylpyrid-inium chloride
N-2-(N-ethyl-N-phenylamino)-ethyl-3-methylpyridinium chloride
N-2-(N-ethyl-N-3-methylphenylamino)-ethyl-3-methyl pyridinium chloride
N-2-(N-methyl-N-phenylamino)-ethyl-4-methylpyridinium chloride
N-2-(N-propyl-N-phenylamino)-ethyl-4-methylpyridinium chloride
N-2-(N-ethyl-N-3-chlorophenylamino)-ethyl-4-methylpyridinium chloride
N-2-(N-ethyl-N-3-acetylaminophenylamino)-ethyl-4-methylpyridinium chloride
N-3-(N-ethyl-N-phenylamino)-2-hydroxypropyl-4-methylpyridinium chloride
N-2-(N-ethyl-N-2-methoxy-5-methylphenylamino)-ethyl-4-methyl pyridinium chloride Compounds of the formula:

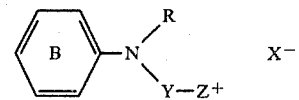

required for the above process may be made by reacting a compound of the formula:

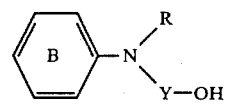

with for example phosphorus oxychloride, phosphorus trichloride, phosphorus pentachloride or preferably thionyl chloride either neat or in an inert solvent such as toluene at about 40° to 75° C. to convert the hydroxy group to chlorine and then reacting the product with 4-methylpyridine to give the desired quaternary salt.

In an alternative process the dyestuffs of the present invention can be manufactured by reacting 3- or 4-methylpyridine with a compound

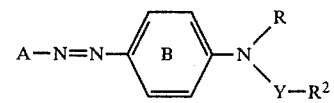

wherein A, B, R and Y are as hereinbefore defined and $R^2$ is a group capable of reacting with a tertiary base to give a cationic group. Compounds for use in this alternative process may be obtained for example by coupling a diazotised $ANH_2$ on to a compound of the formula:

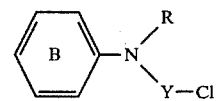

or by coupling on to a compound of the formula:

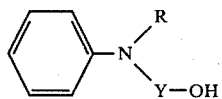

followed by replacement of the hydroxyl by halogen.

Examples of $R^2$ include sulphato groups and halogen atoms such as chlorine or bromine, particularly chlorine.

This alternative process of the invention may conveniently be carried out by heating the compound and the 3- or 4-methylpyridine together in a solvent which may be an excess of the amine or solvents such as water, aryl halides such as monochlorobenzene and o-dichlorobenzene, tetrahydrofuran, acetone, N,N-dimethylformamide and dimethylsulphoxide or mixtures of these. Suitable reaction temperatures are from 20° to 150° C. but higher temperatures may be used if desired.

The dyestuff may be isolated from the reaction mixture for example by filtration if insoluble or by dilution with an appropriate non-solvent followed by isolation of the precipitated dyestuff or by dilution with water, separation of water-soluble impurities, and precipitation by salting out with, for example, sodium chloride or as a double salt, with zinc chloride.

The dyestuffs of the present invention are advantageous over dyestuffs of similar structure but which have different cationic groups in that the present dyestuffs which have a 3- or 4-methylpyridinium cationic groups can be obtained in an improved physical form and have better solubility in water and aqueous organic solvents. The improved solubility is particularly good in the case of dyestuffs with a 4-methylpyridinium cationic group. It may be necessary in some cases to introduce a slight heat treatment at 35° to 60° C. into the isolation stage in order to obtain the improved physical form.

Thus with some known dyestuffs such as Basic Red 18:1, precipitation from the coupling reaction gives a precipitate which is slow to filter and gives a filter paste or filter cake of only about 40% solids strength. Such a filter paste is slow to dry and additionally retains large quantities of salt which are deleterious to the aqueous solubility of the product particularly in concentrated liquid formulations. The related dyestuff of the present invention having a 4-methylpyridinium cationic group precipitates at 25° C. in a better form than Basic Red 18:1 and additionally it is found that on heating this precipitated product to 35° to 60° C. a morphological change to a larger crystalline form takes place and the dyestuff filters rapidly to give a filter paste of approximately 75% solids. This has the advantage that it is easily dried minimising the previous bulk drying problem, the salt retention is much lower and aqueous solubility and solubility in aqueous organic liquid formulations is further increased.

The dyestuffs of the invention are valuable for obtaining shades on synthetic polymeric materials in the form of textile materials by applying the dyestuff from an aqueous dyebath. The dyestuffs are particularly valuable for application to polymers and copolymers of acrylonitrile and of dicyanoethylene and polyesters, polyamides and cellulose esters and blends containing such materials. The polymeric materials may be modified, for example acid-modified.

The dyestuffs of the invention may for example be applied to polyacrylonitrile or polydicyanoethylene materials from acid, neutral or slightly alkaline dyebaths (i.e. pH from 3 to 8) at temperatures between 40° and 120° C. and preferably between 80° and 120° C. or by printing techniques using thickened print pastes.

On polyacrylonitrile, especially when the polyacrylonitrile has been modified to contain acidic groups, dyeings in bright yellow to blue shades are obtained which are distinguished by their good wet and light fastness and high tinctorial strength and build up.

The dyestuffs of the invention may also be applied by a wet transfer printing process in which a support such as paper is printed with an ink containing a dyestuff, the printed support is placed in contact with a textile material and the whole then subjected to heat and pressure under humid/wet conditions.

The dyestuffs are also particularly valuable for colouration preferably from neutral dyebaths, of polyamide and polyester polymeric materials which are modified to contain acidic groups.

The invention is illustrated but not limited by the following Examples in which all parts and percentages are by weight unless otherwise specified.

EXAMPLE 1

Preparation of 4-nitro-2-chloroaniline
N-2-(N'-ethylanilino)-ethyl-4-methylpyridinium chloride Diazotisation A slurry of 52.2 parts of 4-nitro-2-chloroaniline in 600 parts of water and 70.2 parts of concentrated hydrochloric acid were stirred at ambient temperature for 18 hours. Crushed ice was then charged to reduce the temperature to 0° C. and a solution of 21 parts of sodium nitrite in 60 parts of water added in one portion. The resulting diazo solution was stirred for ½ hour at 0°-5° C. in the presence of nitrous acid, filtered and excess of the latter removed by the addition of sulphamic acid solution.

Coupling

To the stirred diazo solution at 0°-5° C. was added, over ½ hour, a solution of 91.25 parts of N-2-(N'-ethylanilino)ethyl-4-methylpyridinium chloride in 200 parts of water.

After addition of the diazo solution was completed, the product began to precipitate as micro needles, c.a. 1$\mu$ in size. The reaction mixture was stirred for a further 3 hours at 0°-5° C. and then 18 hours at 20° C. At this stage microscopic investigation showed the dyestuff to be present as crystalline, small needle-like clusters having an overall brownish appearance (the crystals which precipitated initially from the coupling medium had a reddish appearance).

Morphological change

20 Parts of sodium chloride (1% w/v) were charged to the reaction mixture and the temperature raised to 40°±5° C. and maintained at this level for a total of 5 hours. During this time, the dyestuff underwent a marked morphological change to much larger ruby-type crystals. The mixture was cooled at 30° C. and filtered on a 15 cm nutsche in 25 secs. the highly crystalline product having a greenish sheen.

It dyes Orlon a yellowish-red shade, rated trace blue and trace brighter v. Basic Red 18:1, having excellent fastness properties.

It has superior aqueous solubility to Basic Red 18:1 as shown below, both dyestuffs having a chloride anion.

| Temperature | Solubility in water (in grams/100 ml) | |
| --- | --- | --- |
| °C. | Example 1 | Basic Red 18.1 |
| 30 | 2.5 | 2 |
| 60 | 62 | 37 |
| 90 | >100 | 39 |

By a similar procedure, the following dyes may also be obtained:

| Example | Dyestuff | Anion | Shade on Polyacrylonitrile |
|---|---|---|---|
| 2 | 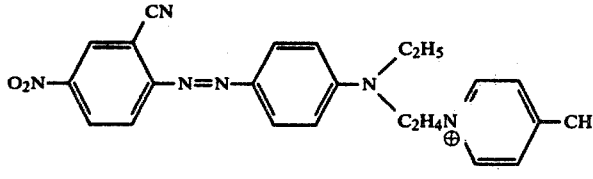 | Cl⊖ | Rubine |
| 3 | 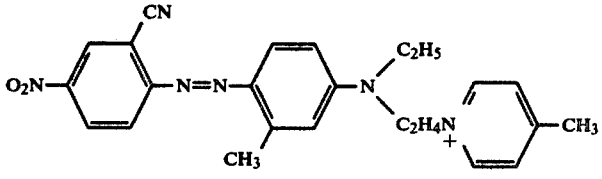 | " | Bordeaux |
| 4 | 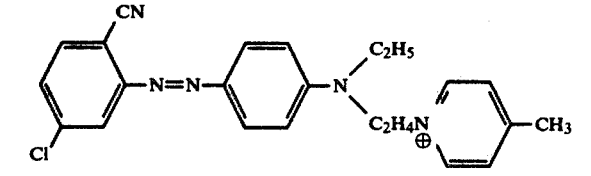 | " | Orange |
| 5 | 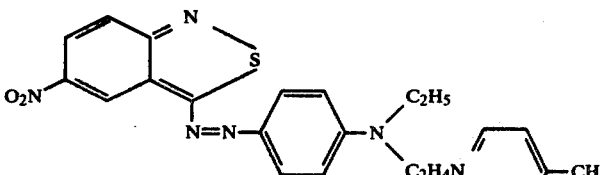 | Cl⊖ | Reddish-blue |
| 6 | 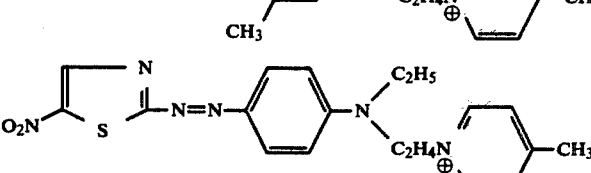 | " | Violet |
| 7 | 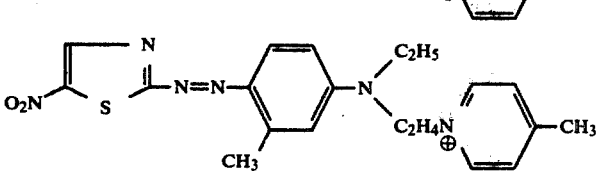 | " | Reddish-blue |
| 8 | 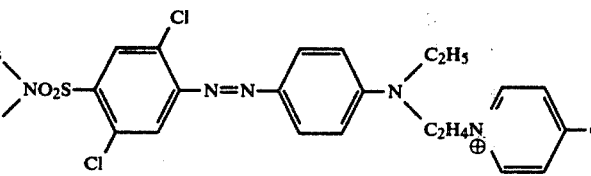 | Cl⊖ | Orange |
| 9 | 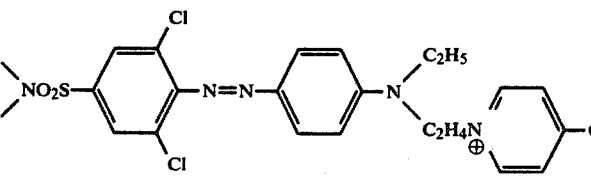 | " | Reddish-yellow |
| 10 | 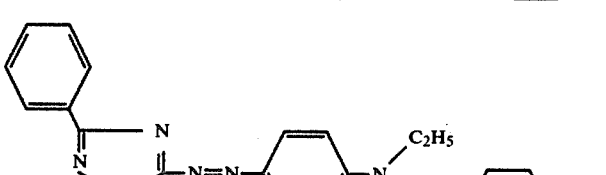 | " | Red |

| Example | Dyestuff | Anion | Shade on Polyacrylonitrile |
|---|---|---|---|
| 11 | | Cl⊖ | Red |
| 12 | | " | Violet |
| 13 | | " | Red |

We claim:

1. A basic azo dyestuff devoid of sulphonic acid and carboxylic acid groups having the formula:

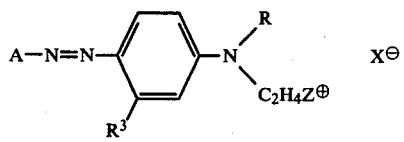

wherein A is an optionally substituted aromatic carbocyclic or heterocyclic radical, R is alkyl containing from 1 to 4 carbon atoms which may be branched or unbranched, Z is 3 or 4-methylpyridinium, $R^3$ is hydrogen or methyl and X⊖ is an anion.

2. An azo dyestuff as claimed in claim 1 wherein R is ethyl.

3. Basic azo dyestuffs as claimed in claim 2 wherein X⊖ is chlorine.

4. Basic azo dyestuffs as claimed in claim 2 wherein A is the residue of the diazo component derived from 4-nitro-2-chloroaniline, 4-nitro-2-cyano-aniline, 5-nitro-2-amino-thiazole, 3-phenyl-5-amino-1,2,4-thiadiazole or 2,4-dinitro-6-bromo-aniline.

5. A basic azo dyestuff of the formula:

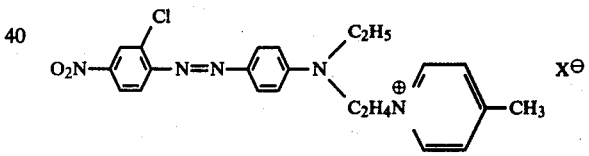

where X is an anion.